(12) United States Patent
Nagata et al.

(10) Patent No.: US 8,466,898 B2
(45) Date of Patent: Jun. 18, 2013

(54) INPUT DEVICE AND DISPLAY DEVICE INCLUDING THE SAME

(75) Inventors: Yasunari Nagata, Kirishima (JP); Takashi Shimizu, Kirishima (JP); Yoshio Miyazaki, Kirishima (JP); Takashi Minami, Kirishima (JP)

(73) Assignee: Kyocera Corporation, Kyoto (JP)

( * ) Notice: Subject to any disclaimer, the term of this patent is extended or adjusted under 35 U.S.C. 154(b) by 704 days.

(21) Appl. No.: 12/713,010

(22) Filed: Feb. 25, 2010

(65) Prior Publication Data
US 2010/0220076 A1    Sep. 2, 2010

(30) Foreign Application Priority Data

Feb. 27, 2009  (JP) ................. 2009-044966
Jan. 29, 2010  (JP) ................. 2010-017646

(51) Int. Cl.
   *G06F 3/045*  (2006.01)
(52) U.S. Cl.
   USPC .................. 345/174; 178/18.05
(58) Field of Classification Search
   USPC ............ 345/173–178; 178/18.01–18.06, 178/20.01–20.04
   See application file for complete search history.

(56) References Cited

U.S. PATENT DOCUMENTS

| | | | |
|---|---|---|---|
| 6,943,705 B1* | 9/2005 | Bolender et al. | 341/33 |
| 7,227,537 B2* | 6/2007 | Nakayama et al. | 345/173 |
| 2008/0100592 A1* | 5/2008 | Shigeno et al. | 345/174 |
| 2011/0141046 A1* | 6/2011 | Sato et al. | 345/173 |
| 2012/0132511 A1* | 5/2012 | Tanaka et al. | 200/600 |

FOREIGN PATENT DOCUMENTS

JP    2001-331275    11/2001

* cited by examiner

*Primary Examiner* — Vijay Shankar
(74) *Attorney, Agent, or Firm* — DLA Piper LLP (US)

(57) ABSTRACT

An input device includes an insulation layer having a first main surface, and a second main surface positioned on the opposite side of the first main surface, a first detection electrode pattern provided on the first main surface of the insulation layer and arranged along a first direction, a second detection electrode pattern arranged along a second direction and having an intersection region provided on the second main surface of the insulation layer so as to intersect with the first detection electrode pattern in a plan view, and a detection region provided on the first main surface of the insulation layer, and a conductive electrode provided on the second main surface of the insulation layer, in which the conductive electrode has an opening, and the intersection region of the second detection electrode pattern is positioned in the opening.

11 Claims, 18 Drawing Sheets

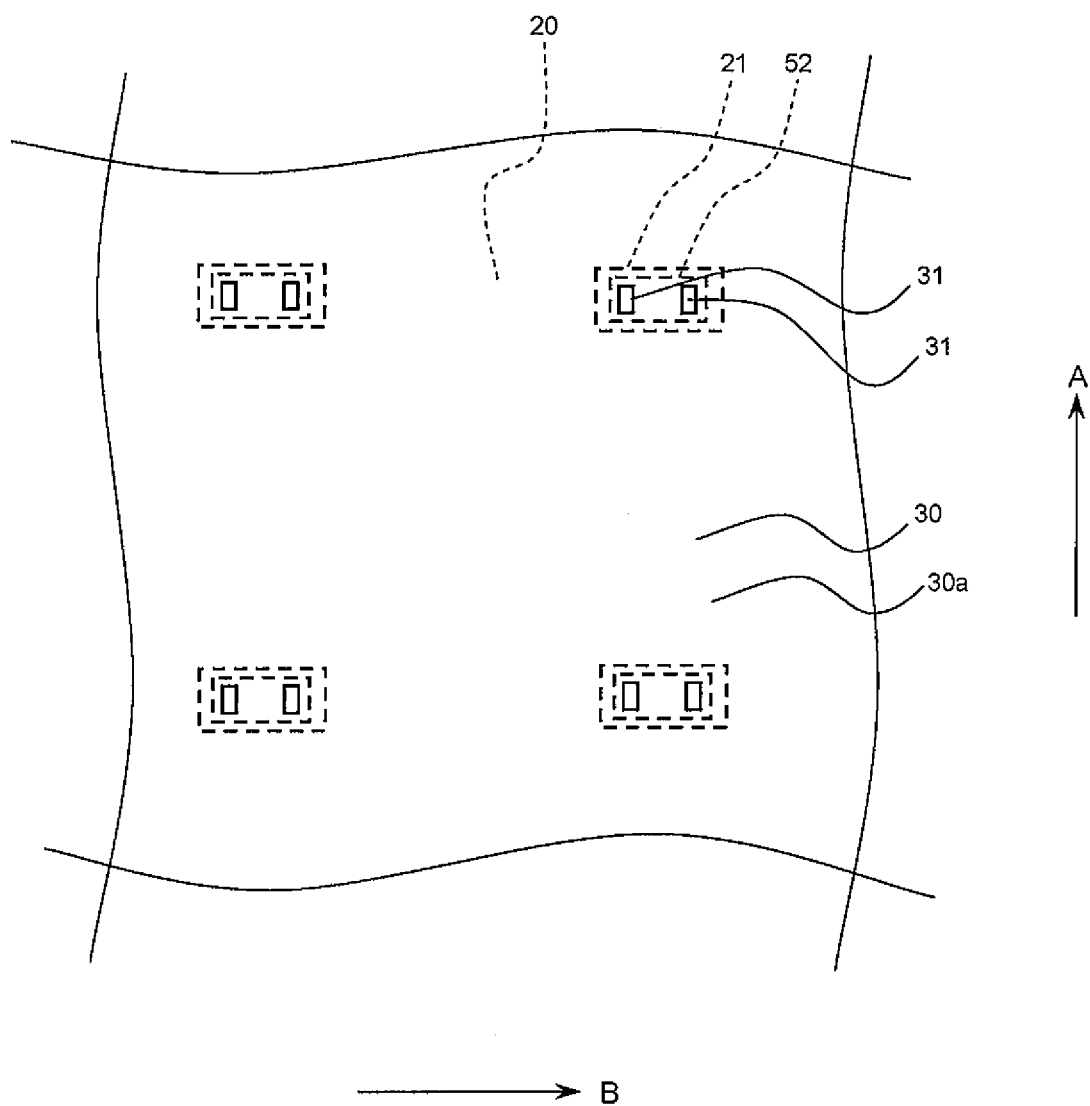

INPUT DEVICE AND DISPLAY DEVICE INCLUDING THE SAME

BACKGROUND OF THE INVENTION

1. Field of the Invention

The present invention relates to an input device and a display device including the input device.

2. Description of the Related Art

A conventional input device includes a base, a first detection electrode pattern provided on the base, and a second detection electrode pattern provided on the base and intersecting with the first detection electrode pattern. In general, such an input device is mounted on an electronic device such as a display device.

For example, in the input device mounted on the display device, when an electromagnetic wave generated by a drive signal of the display device reaches the first detection electrode pattern or the second detection electrode pattern of the input device, the electromagnetic wave is detected as a noise, which causes the detection precision of an input position to be lowered.

In an input device disclosed in Japanese Unexamined Patent Publication No. 2001-331275, a harmful effect of the electromagnetic wave is lowered by providing a conductive electrode between the first and second detection electrode patterns and the display device.

However, this conductive electrode may cause the less permeability of light in an intersection region between the first detection electrode pattern and the second detection electrode pattern. In this case, there is possibility that the image quality of the display device deteriorates.

SUMMARY OF THE INVENTION

An input device according to one embodiment of the present invention includes an insulation layer having a first main surface, and a second main surface positioned on the opposite side of the first main surface, a first detection electrode pattern provided on the first main surface of the insulation layer and arranged along a first direction, a second detection electrode pattern arranged along a second direction and having an intersection region provided on the second main surface of the insulation layer so as to intersect with the first detection electrode pattern when viewed from the top, and a detection region provided on the first main surface of the insulation layer, and a conductive electrode provided on the second main surface of the insulation layer, in which the conductive electrode has an opening, and the intersection region of the second detection electrode pattern is positioned in the opening.

BRIEF DESCRIPTION OF THE DRAWINGS

FIG. 3 is a plan view showing a conductive electrode, an insulation layer, and a second connection electrode in the input device in FIG. 1;

DESCRIPTION OF THE PREFERRED EMBODIMENTS

First Embodiment

First, an input device X1 according to a first embodiment of the present invention is described with reference to FIGS. 1 to 5. The input device X1 according to this embodiment is a capacitance type touch panel.

Figure 1:
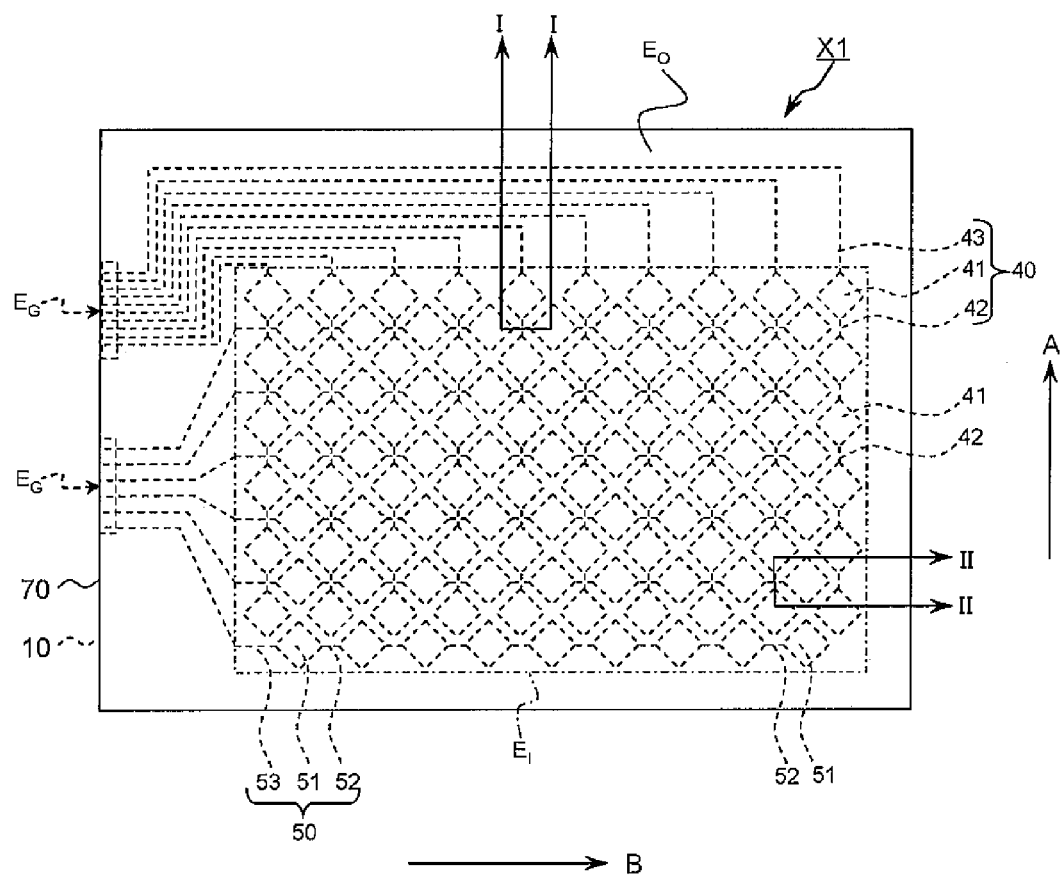
FIG. 1 is a plan view of an input device according to a first embodiment of the present invention.

As shown in FIG. 1, the input device X1 has an input region $E_I$ which a user points or presses with a conductor such as a finger or an input pen to input the information, and an outside region $E_O$ located outside the input region $E_I$. In addition, the outside region $E_O$ has an external conduction region $E_G$ electrically connected to an FPC (Flexible Printed Circuit) provided outside the drawing.

The input device X1 includes a base 10, a conductive electrode 20, an insulation layer 30, a first detection electrode pattern 40, a second detection electrode pattern 50, a bonding member 60, and a protection substrate 70.

The base 10 supports the conductive electrode 20, the insulation layer 30, the first detection electrode pattern 40, and the second detection electrode pattern 50. While a shape of the base 10 is rectangular in a plan view as FIG. 1, the configuration is not limited to this. The base 10 may be formed of a material having an insulation property and a translucent property such as glass or plastic. Here, the translucent property means permeability to visible light.

The conductive electrode 20 has a function to absorb an electromagnetic wave. The conductive electrode 20 is formed of a material having a translucent property and a conductive property, such as ITO (Indium Tin Oxide), IZO (Indium Zinc Oxide), ATO (Antimony Tin Oxide), AZO (Al-Doped Zinc Oxide), tin oxide, zinc oxide, or conductive polymer.

According to this embodiment, the conductive electrode 20 is provided on the base 10. Namely, the conductive electrode 20 is positioned on the input region $E_I$ and the outside region $E_O$. Thus, an electromagnetic wave generated by a drive signal of a display device is less likely to reach the first detection electrode pattern 40 and the second detection electrode pattern 50 in the input region $E_I$, as well as the first detection electrode pattern 40 and the second detection electrode pattern 50 in the outside region $E_O$.

The conductive electrode 20 may be positioned anywhere as long as the conductive electrode 20 is positioned at least in the input region $E_I$. Furthermore, the conductive electrode 20 is substantially uniform in thickness by setting a film thickness distribution of the conductive electrode 20 within ±10% from an average value of the whole film thicknesses.

Figure 4:
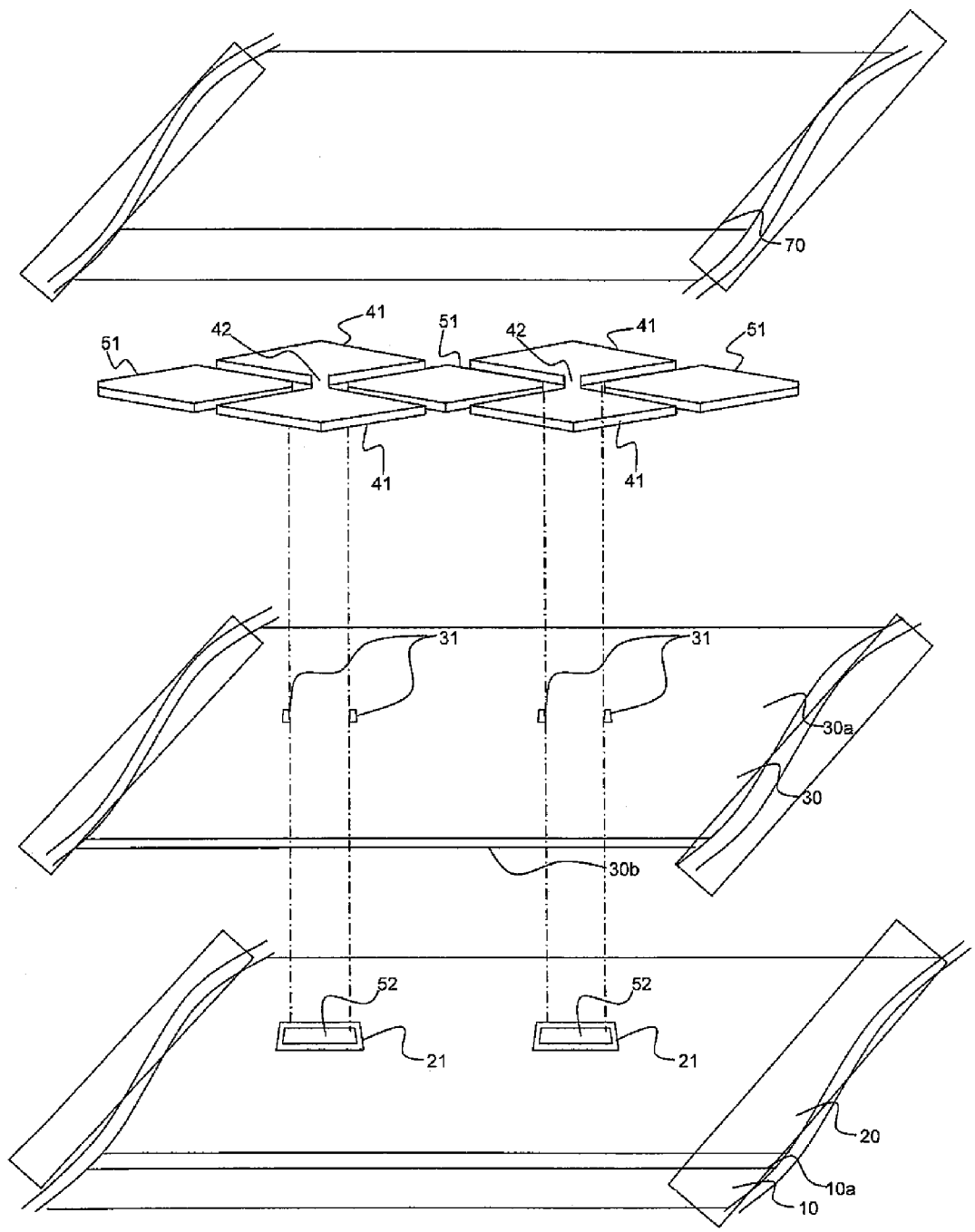
FIG. 4 is an exploded perspective view showing an essential part of the input device in FIG. 1.

Furthermore, as shown in FIGS. 3 and 4, the conductive electrode 20 has a plurality of openings 21. An intersection region 50a of the second detection electrode pattern 50 is located within the opening 21.

Furthermore, the conductive electrode 20 is preferably set to a reference potential such as a ground potential. In this case, the conductive electrode 20 can more efficiently absorb the electromagnetic wave generated in the display device.

A method of forming the conductive electrode 20 includes the following steps. First, an ITO film is formed on the base 10 by a sputtering method, evaporation method, or chemical vapor deposition (CVD) method. Then, a photosensitive resin is applied onto the surface of the ITO film, and the applied photosensitive resin is subjected to an exposure treatment and a development treatment to form a desired pattern thereon. Then, the ITO film is etched with a chemical solution to form the opening 21 in the ITO film. Then, the photosensitive resin provided on the surface of the ITO film is removed.

The insulation layer 30 electrically isolates the conductive electrode 20, the first detection electrode pattern 40, and the second detection electrode pattern 50 from each other. Although the insulation layer 30 in this embodiment is positioned in both the input region $E_I$ and the outside region $E_O$, the insulation layer 30 is positioned anywhere as long as the insulating layer 30 may be positioned at least in the input region $E_I$. Furthermore, the insulation layer 30 is substantially uniform in thickness by setting a film thickness distribution of the insulation layer 30 within ±10% from an average value of the whole film thicknesses.

The insulation layer 30 has a first main surface 30a and a second main surface 30b. The first main surface 30a faces a user when the input device is used. The second main surface 30b is on the opposite side of the first main surface 30a. The insulation layer 30 is formed of a material having an insulation property and a translucent property, for example, a resin such as an acrylic resin and an epoxy resin.

As shown in FIG. 3, the insulation layer 30 has through holes 31 in the openings 21 of the conductive electrode 20. In this embodiment, the two through holes 31 are provided in the one opening 21.

As a method of forming the insulation layer 30, an acrylic resin, for example, is applied onto, the surface of the conductive electrode 20, and the acrylic resin is subjected to an exposure treatment and a development treatment.

The first detection electrode pattern 40 has a plurality of first detection electrodes 41, a plurality of first connection electrodes 42, and a first power supply line 43. In addition, the first detection electrode pattern 40 is arranged along a B direction as a first direction, on the first main surface 30a of the insulation layer 30.

The first detection electrode 41 has a function to detect an input position in the B direction. The first detection electrode 41 is provided on the first main surface 30a of the insulation layer 30 in the input region $E_1$. The first detection electrodes 41 are arranged at predetermined intervals in the form of a matrix. While a shape of the first detection electrode 41 is a diamond shape in a plan view as FIG. 1, the shape may be not only a diamond shape but any shape such as an ellipsoidal shape, a circular shape, or a polygonal shape such as, a convex polygonal shape or a concave polygonal shape.

Figure 5:
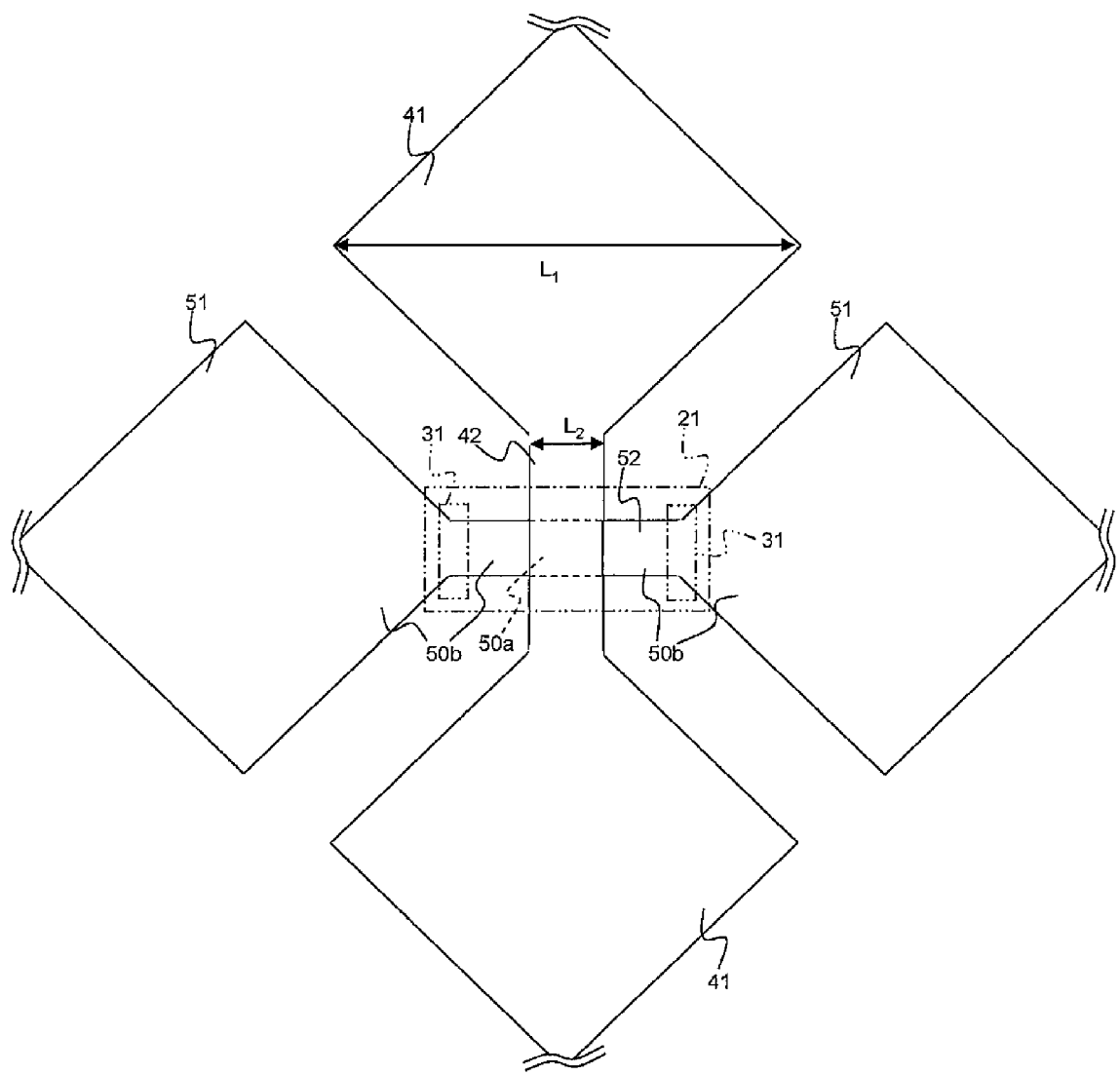
FIG. 5 is a plan view showing an intersection region between a first detection electrode pattern and a second detection electrode pattern in the input device in FIG. 1.

As shown in FIG. 5, a width $L_1$ of the first detection electrode 41 is set larger than a width $L_2$ of the first connection electrode 42 according to this embodiment, and for example, the width $L_1$ of the first detection electrode 41 is five to thirty times as large as the width $L_2$ of the first connection electrode 42. The relationship between the width $L_1$ of the first detection electrode 41 the width $L_2$ of the first connection electrode 42 is not limited to this embodiment. For example, a width $L_1$ may be set equal to or smaller than a width $L_2$.

The first detection electrode 41 may be formed of the same material as that of the conductive electrode 20. A method of forming the first detection electrode 41 can be the same as that of the conductive electrode 20.

The first connection electrode 42 electrically connects the adjacent first detection electrodes 41. The first connection electrode 42 is provided on the first main surface 30a of the insulation layer 30 in the input region $E_1$.

As shown in FIGS. 2, 4, and 5, the first connection electrode 42 intersects with the second detection electrode pattern 50 through the insulation layer 30. The first connection electrode 42 may be formed of the same material as that of the conductive electrode 20. A method of forming the first connection electrode 42 can be the same as that of the conductive electrode 20.

The first power supply line 43 applies a voltage to the first detection electrodes 41. The first power supply line 43 is provided on the first main surface 30a of the insulation layer 30 in the outside region $E_O$. One end of the first power supply line 43 is electrically connected to the first detection electrode 41, and the other end thereof is in the external conduction region $E_G$. The first power supply line 43 may be formed of a material having a conductive property such as ITO, tin oxide, aluminum, aluminum alloy, silver film, or silver alloy, for example. A method of forming the first power supply line 43 can be the same as that of the conductive electrode 20.

The second detection electrode pattern 50 has a plurality of second detection electrodes 51, a plurality of second connection electrodes 52, and a second power supply line 53. As shown in FIG. 1, the second detection electrode pattern 50 is arranged along an A direction as a second direction.

Figure 2A:
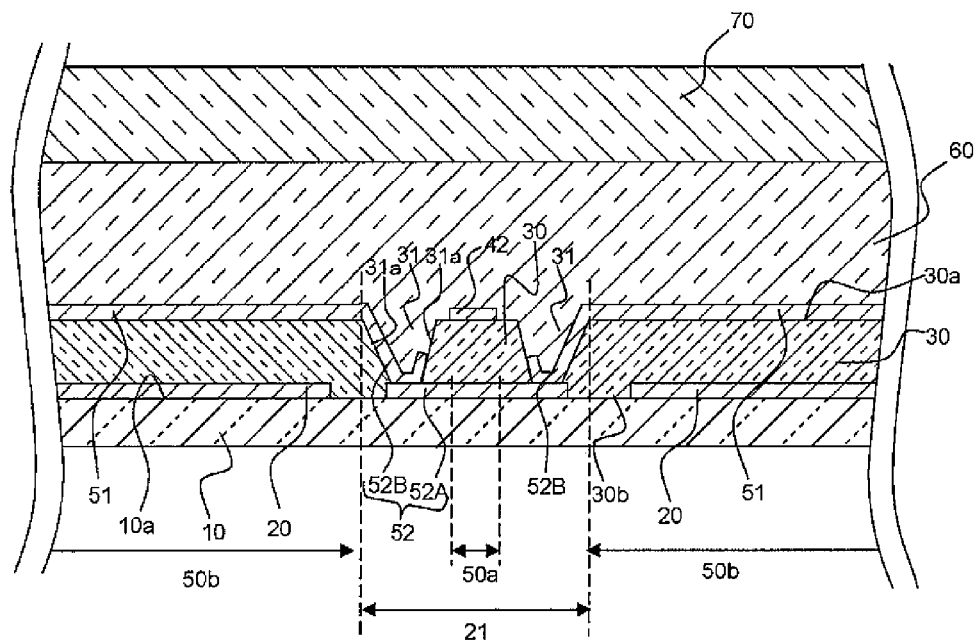
FIG. 2A is a cross-sectional view taken along a line I-I in FIG. 1.
Figure 2B:
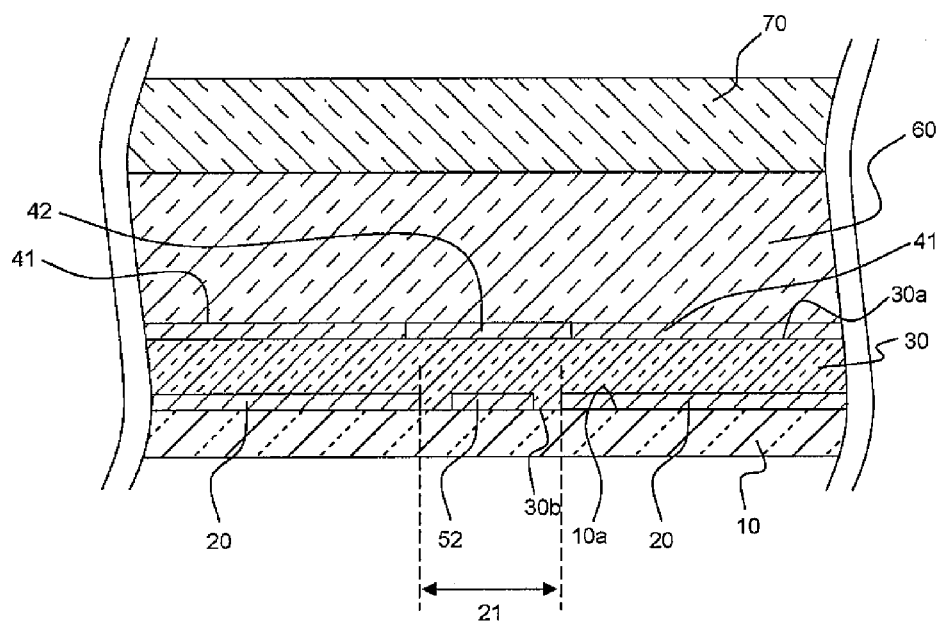
FIG. 2B is a cross-sectional view taken along a line II-II in FIG. 1.

As shown in FIGS. 2A, 2B, and 5, the second detection electrode pattern 50 has the intersection region 50a provided on the second main surface 30b of the insulation layer 30 so as to intersect with the first detection electrode pattern 40 when viewed from the top, and a detection region 50b provided on the first main surface 30b of the insulation layer 30.

FIG. 5 is a plan view showing a region in which the first detection electrode pattern 40 intersects with the second detection electrode pattern 50. The opening 21 of the conductive electrode 20 and the through hole 31 of the insulation layer 30 are shown by chain lines. The intersection region 50a of the second detection electrode pattern 50 is shown by broken lines.

The second detection electrode 51 has a function to detect an input position in the A direction shown by an arrow. The second detection electrode 51 is provided on the first main surface 30a of the insulation layer 30 in the input region $E_I$. Namely, the detection region 50b is in the second detection electrode 51 and is provided on the first main surface 30a. In addition, the second detection electrodes 51 are arranged at predetermined intervals in the shape of a matrix. While the shape of the second detection electrode 51 is a diamond shape in a plan view as FIG. 1, the shape may be not only a diamond shape but an ellipsoidal shape, a circular shape, or a polygonal shape such as a convex polygonal shape or a concave polygonal shape.

As in the first detection electrode pattern 40, a width of the second detection electrode 51 is set larger than a width of the second connection electrode 52 according to this embodiment, and for example, the width of the second detection electrode 51 is five to thirty times as large as the width of the second connection electrode 52. The relationship between the width of the second detection electrode 51 and the width of the second connection electrode 52 is not limited to this embodiment. The width $L_1$ of the second detection electrode 51 may be substantially the same as or smaller than the width $L_2$ of the second connection electrode 52.

The second detection electrode 51 may be formed of the same material as that of the conductive electrode 20. A method of forming the second detection electrode 51 can be the same as that of the conductive electrode 20.

The second connection electrode 52 electrically connects the adjacent second detection electrodes 51. As shown in FIG. 2A, the second connection electrode 52 has a flat part 52A on the second main surface 30b of the insulation layer 30 and an inclined part 52B on an inner wall surface 31a of the through hole 31 of the insulation layer 30. According to this embodiment, the second connection electrode 52 is electrically connected to the second detection electrode 51 via the inclined part 52B in the through hole 31 of the insulation layer 30, but the present invention is not limited to this.

The flat part 52A of the second connection electrode 52 is located within the opening 21 of the conductive electrode 20. In addition, as shown in FIGS. 2A, 2B, and 5, the flat part 52A of the second connection electrode 52 intersects with the first detection electrode pattern 40. More specifically, the flat part 52A of the second connection electrode 52 intersects with the first connection electrode 42. Consequently, the intersection region 50a is located within the flat part 52A of the second connection electrode 52, and provided on the second main surface 30b of the insulation layer 30.

According to this embodiment, the flat part 52A of the second connection electrode 52 is electrically insulated from the conductive electrode 20 by arranging the flat part 52A in the opening 21 of the conductive electrode 20 so as to be apart from the conductive electrode 20.

The second connection electrode 52 may be formed of the same material as that of the conductive electrode 20. A method of forming the second connection electrode 52 can be the same as that of the conductive electrode 20.

The second power supply line 53 applies a voltage to the second detection electrode 51. The second power supply line 53 is provided on the first main surface 30a of the insulation layer 30 in the outside region $E_O$. One end of the second power supply line 53 is electrically connected to the second detection electrode 51, and the other end thereof is arranged in the external conduction region $E_G$. The second power supply line 53 can be formed of the same material as that of the first power supply line 43. A method of forming the second power supply line 53 can be the same as that of the conductive electrode 20.

The protecting substrate 70 protects the first detection electrode pattern 40 and the second detection electrode pattern 50 from a direct contact with an external object. The protecting substrate 70 can be formed of a material having a translucent property such as PET, acrylic, or glass.

The bonding member 60 connects the first main surface 30a of the insulation layer 30 to the protecting substrate 70. The bonding member 60 can be formed of an acrylic resin, for example.

When a conductor such as a human's finger or input pen points or presses the protecting substrate 70 in the input region $E_I$, the input device X1 detects the position pointed or pressed by the conductor as an input position. More specifically, when the conductor points or presses the input region $E_I$, the electrostatic capacitance between the conductor and the first detection electrode 41, and/or the electrostatic capacitance between the conductor and the second detection electrode 51 is changed. A signal based on this change of the electrostatic capacitance is supplied to a driver (not shown). The driver calculates the input position based on the signal. Thus, the input device X1 can detect the input position.

In the input device X1, the first detection electrode pattern 40 is formed on the first main surface 30a and the second detection electrode pattern 50 is formed on the first main surface 30a and the second main surface 30b in the input region $E_I$. Thus, the intersection region 50a wherein the second detection electrode pattern 50 intersects with the first detection electrode pattern 40 in a plan view has the number of electrodes less than an intersection region of conventional structures. Therefore, visible light transmission rate in the intersection region 50a is enhanced. As a result, an image quality of the display device can be improved.

It is preferable that the first connection electrode 42 intersects with the second connection electrode 52 in three dimensions when the first detection electrode pattern 41 intersects with the second detection electrode pattern 51 in three dimensions as in the input device X1. That is, since the first connection electrode 42 and the second connection electrode 52 are smaller in planar area than the first detection electrode 41 and the second detection electrode 51, respectively, the area of the opening 21 of the conductive electrode 20 can be small. Therefore, even when the opening 21 is provided, the function of the conductive electrode 20 to absorb the electromagnetic wave is not likely to be lowered.

Second Embodiment

Figure 6:
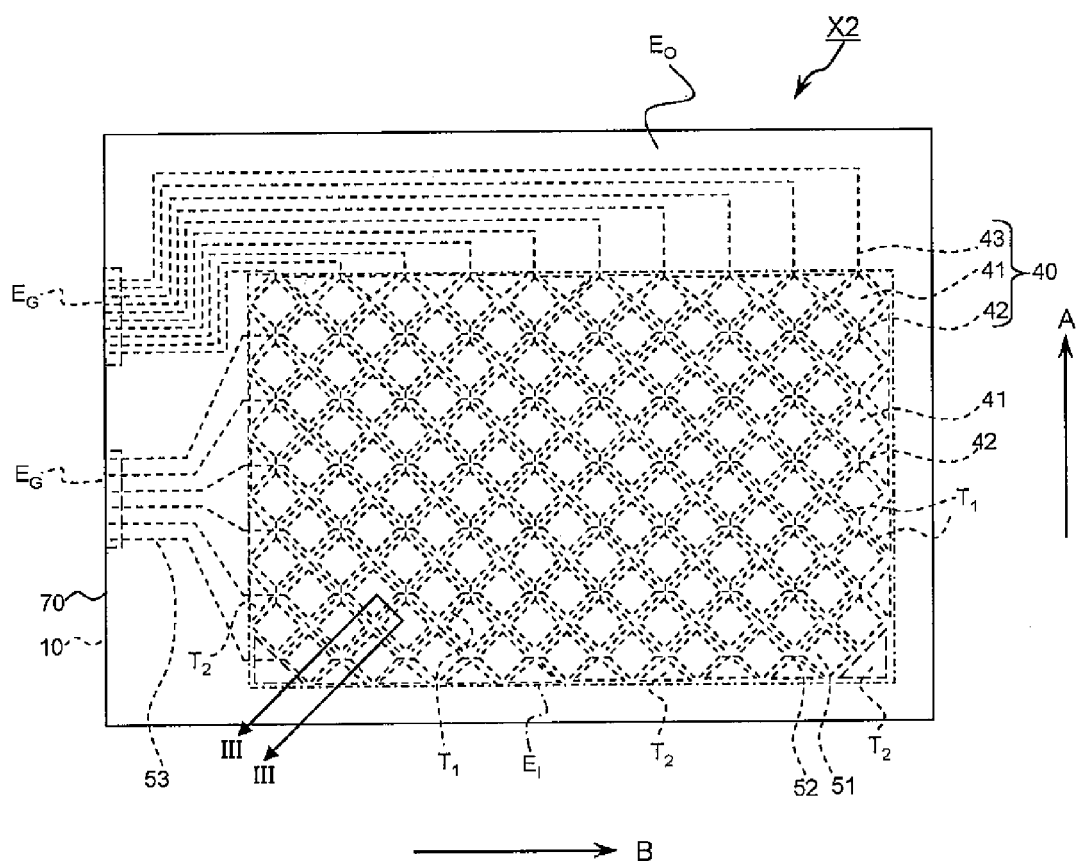
FIG. 6 is a plan view of an input device according to a second embodiment of the present invention.
Figure 7:
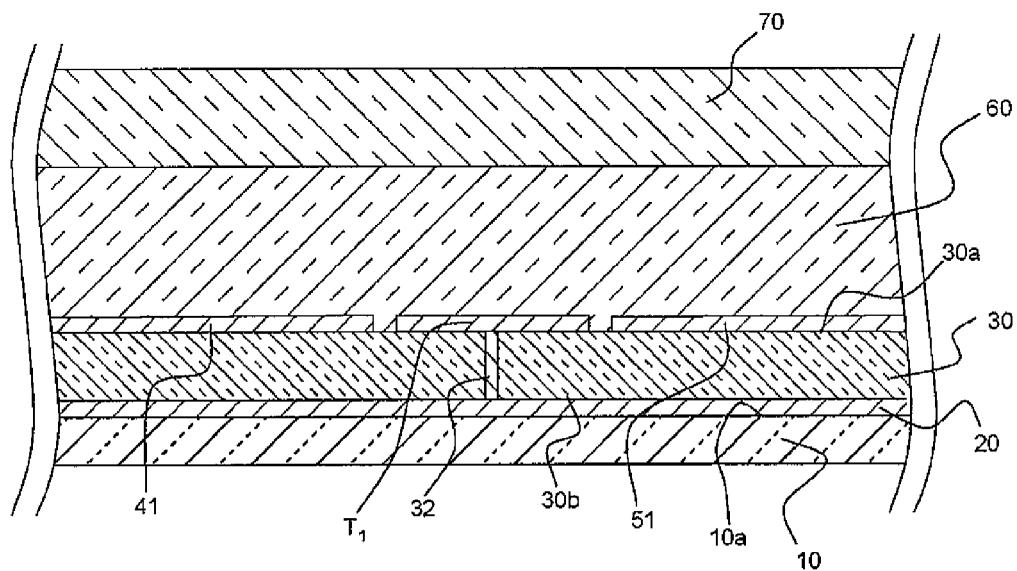
FIG. 7 is a cross-sectional view taken along a line III-III in FIG. 6.

FIG. 6 is a plan view and FIG. 7 is a cross-sectional view schematically showing an input device X2 according to a second embodiment of the present invention. In the input device X2 as compared with the input device X1, adjustment films $T_1$ and $T_2$ are additionally provided.

As shown in FIG. 7, the adjustment films $T_1$ and $T_2$ are provided on the first main surface 30a of the insulation layer 30. As shown in FIG. 6, the adjustment film $T_1$ is provided in a first region between the adjacent first detection electrodes 41, in a second region between the adjacent second detection electrodes 51, and in a third region between the first detection electrode 41 and second detection electrode 51 in a planar view. In addition, the adjustment film $T_2$ is provided in a region of the input region $E_I$ which is covered with neither one of the first detection electrode 41, the second detection electrode 51 and the adjustment film $T_1$, that is, provided in a frame region of the input region $E_I$. The adjustment film $T_2$ may have polygonal shape such as a triangular shape so as to cover the frame region.

In the input device X2, the adjustment films $T_1$ and $T_2$ are provided in the first, the second, the third and the frame regions in the planar view. Accordingly, a difference of visible light transmission rate between an electrode-forming-region where the first or the second detection electrode pattern 40 or 50 is formed, and a film-forming-region where the adjustment film $T_1$ or $T_2$ is formed, can be reduced. Therefore, the visible light transmission rate in the input region $E_I$ can be uniform in the input device X2, so that the image quality is improved when the input device X2 is mounted on the display device.

While the adjustment films are provided in the first, the second, the third and the frame regions adjustment films may be in at least one region of the first, the second, the third and the frame regions.

Furthermore, it is further preferable that the adjustment films $T_1$ and $T_2$ have the same visible light transmission rate as that of the first detection electrode 41 and the second detection electrode 51.

According to this embodiment, by setting the visible light transmission rate of the adjustment films $T_1$ and $T_2$ within ±10% of the visible light transmission rate of the first detection electrode 41 and the second detection electrode 51, the visible light transmission rate of the adjustment films $T_1$ and $T_2$ is set substantially to be equal to the visible light transmission rate of the first detection electrode 41 and the second detection electrode 51.

For example, the visible light transmission rate can be measured as follows. First, an object is irradiated with visible light and emission spectrum of transmitted light from the object is measured. A graph is prepared to show a relationship between light intensity and light wavelength in the measured emission spectrum of the transmitted light and the emission spectrum of the emitted light. Then, with this graph, by calculating an area difference between the emission spectrum of the transmitted light and the emission spectrum of the emitted light, in a visible light range of the wavelength, the visible light transmission rate can be determined. That is, as the area difference is smaller, the visible light transmission rate is higher.

According to this embodiment, the adjustment films $T_1$ and $T_2$ are made of the same material as that of the first detection electrode 41 and the second detection electrode 51, and the adjustment films $T_1$ and $T_2$ have substantially the same thickness as the first detection electrode 41 and the second detection electrode 51, whereby the visible light transmission rate of the adjustment films $T_1$ and $T_2$ is set substantially to be equal to the visible light transmission rate of the first detection electrode 41 and the second detection electrode 51.

As shown in FIG. 7, it is preferable that the adjustment films $T_1$ and $T_2$ are electrically connected to the conductive electrode 20, for example. In this case, a floating electric charge generated in the first, the second and the third regions can be transferred to the conductive electrode 20 through the adjustment films $T_1$ and $T_2$. Therefore, the detection sensitivity of the input position in the input device X2 can be improved. In addition, if the conductive electrode 20 connected to the adjustment films $T_1$ and $T_2$ is set to the reference potential, the floating electric charge can be more likely to be transferred thereto, and the detection sensitivity of the input position can be further improved.

According to this embodiment, the adjustment films $T_1$ and $T_2$ are electrically connected to the conductive electrode 20 via a conductive member such as a through hole conductor 32 provided in the insulation layer 30.

Third Embodiment

Figure 8:
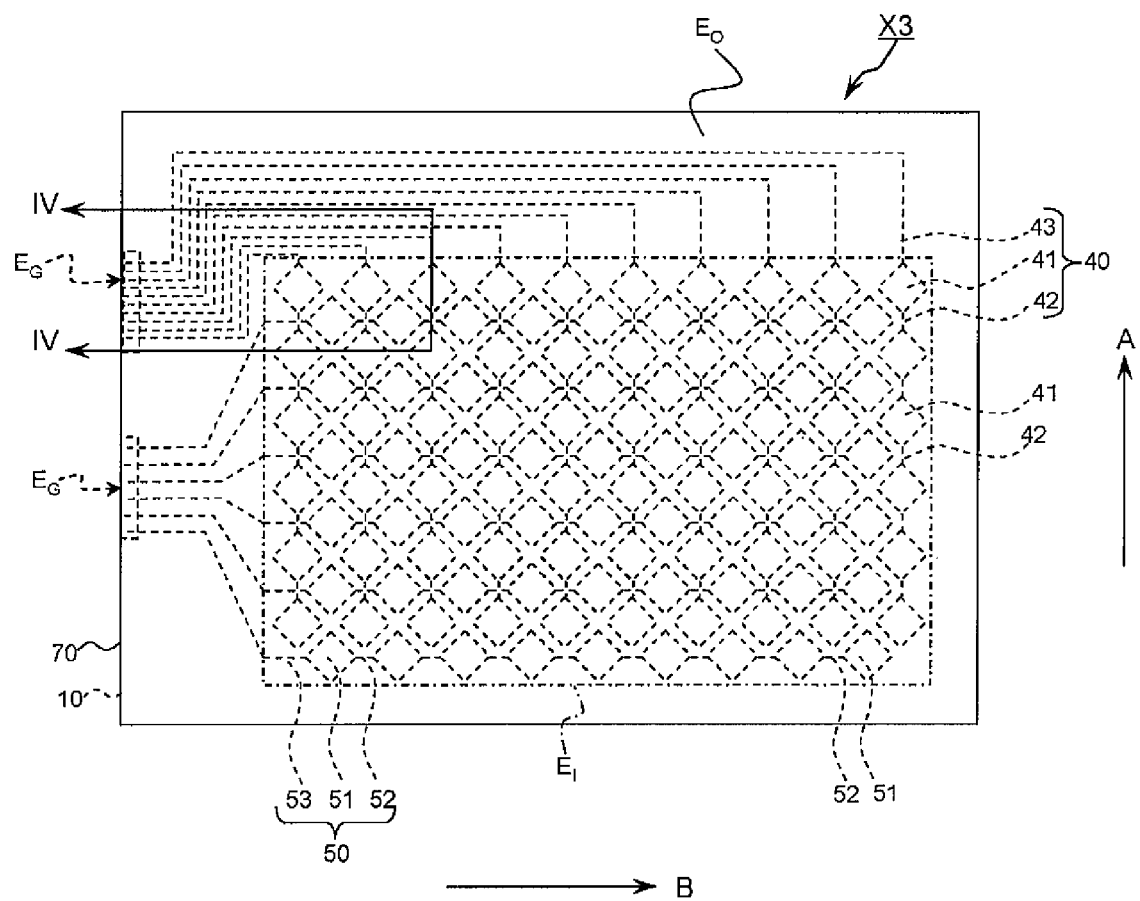
FIG. 8 is a plan view of an input device according to a third embodiment of the present invention.
Figure 9A:
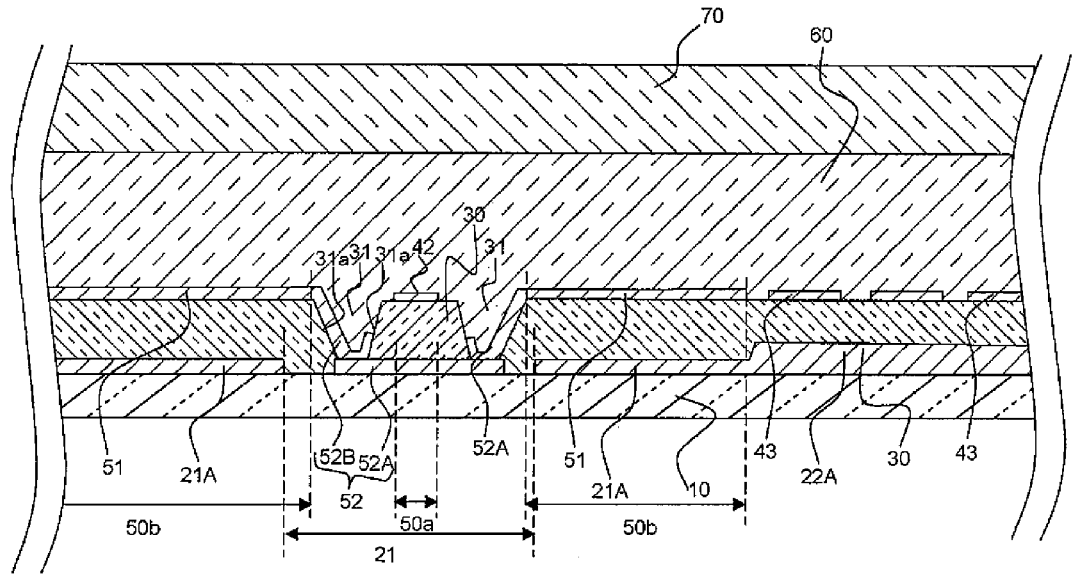
FIG. 9A is a cross-sectional view taken along a line IV-IV in FIG. 8.
Figure 9B:
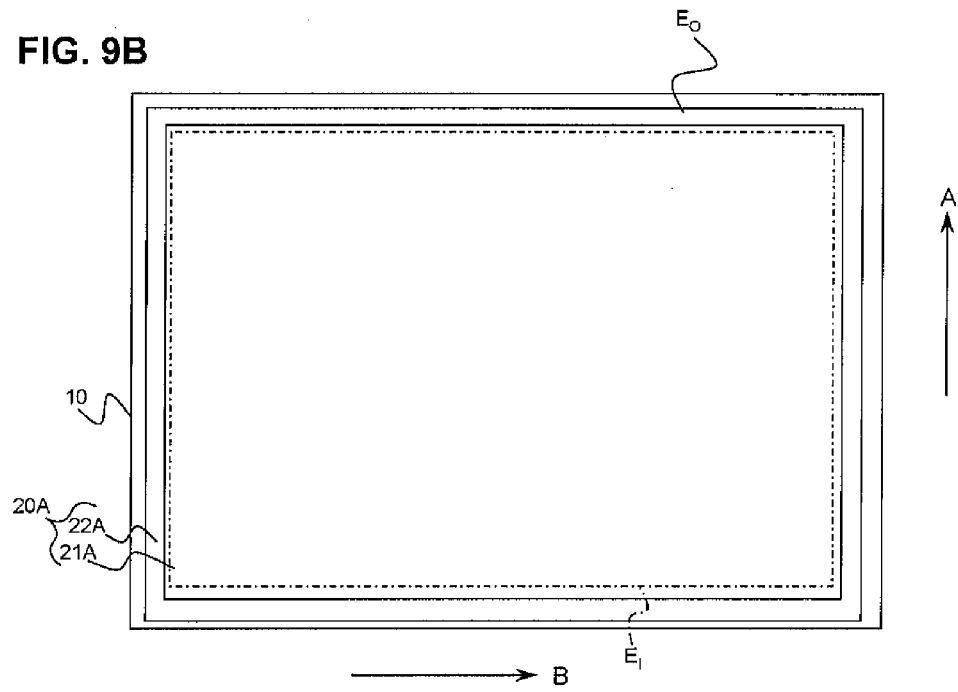
FIG. 9B is a plan view showing a relationship between a conductive electrode, an input region, and an outside region in the input device in FIG. 8.

FIGS. 8 and 9B are plan views and FIG. 9A is a sectional view schematically showing an input device X3 according to a third embodiment of the present invention. As compared with the input device X1, the input device X3 has a conductive electrode 20A instead of the conductive electrode 20.

The conductive electrode 20A includes a high resistance part 21A, and a low resistance part 22A which has a thickness thicker than the high resistance part 21A and is formed of the same material as the material of the high resistance part 21A.

The high resistance part 21A is located within the input region $E_I$ on the base 10. In addition, the high resistance part 21A is formed of the same material as that of the first detection electrode 41.

The low resistance part 22A is located within the outside region $E_O$ on the base 10.

In the input device X3, since the conductive electrode 20A has the low resistance part 22A in the outside region $E_O$, the resistance value of the whole conductive electrode 20A is lowered. In addition, since the low resistance part 22A is in the outside region $E_O$, the visible light transmission rate in the input region $E_T$ is maintained high.

Fourth Embodiment

Figure 10:
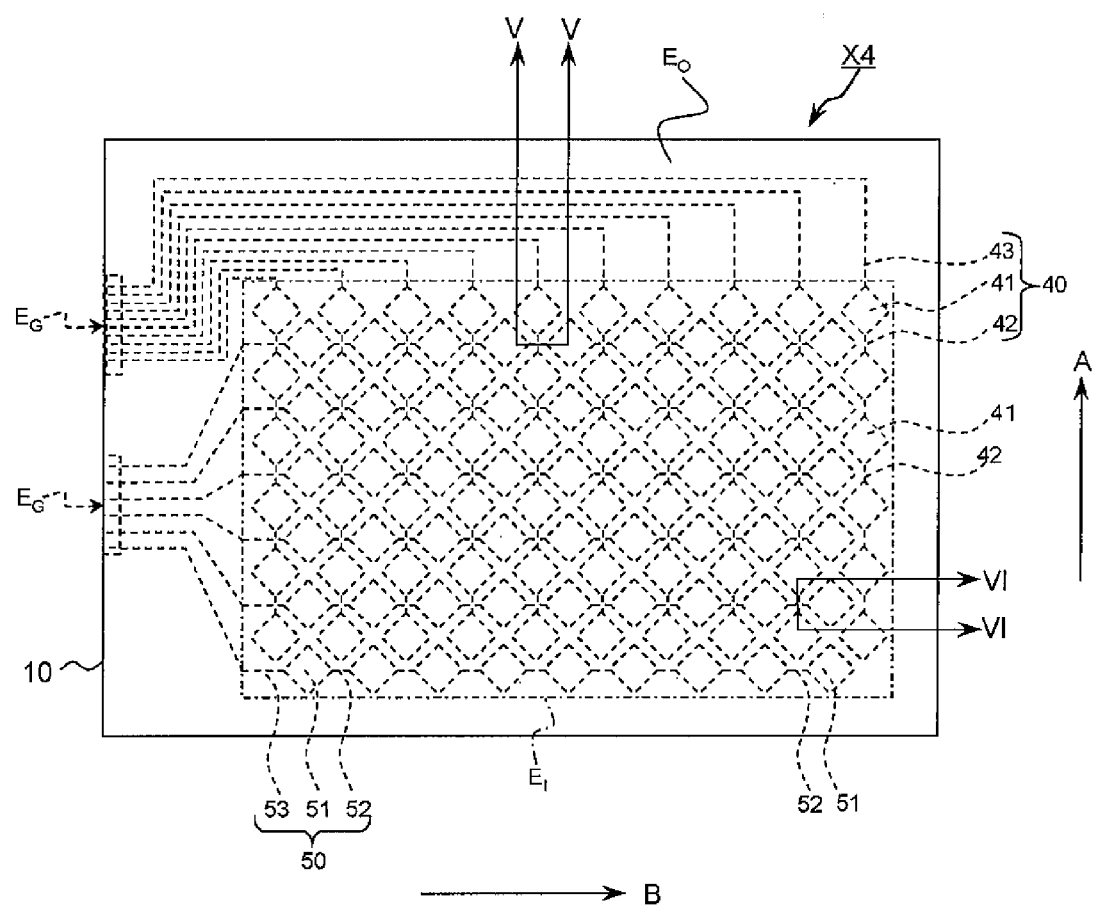
FIG. 10 is a plan view of an input device according to a fourth embodiment of the present invention.
Figure 11A:
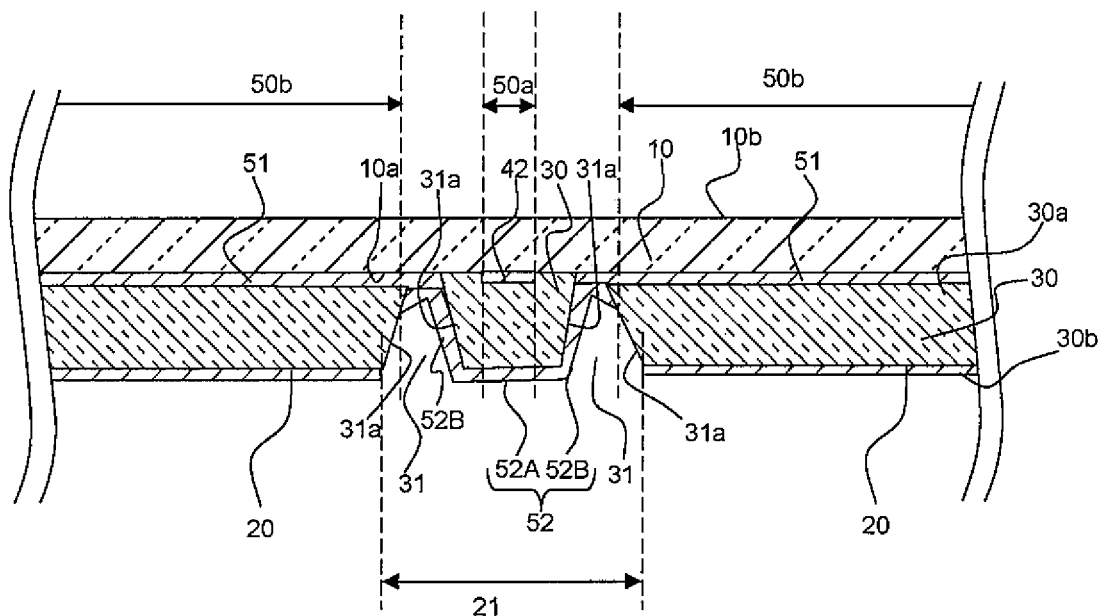
FIG. 11A is a cross-sectional view taken along a line V-V in FIG. 10.
Figure 11B:
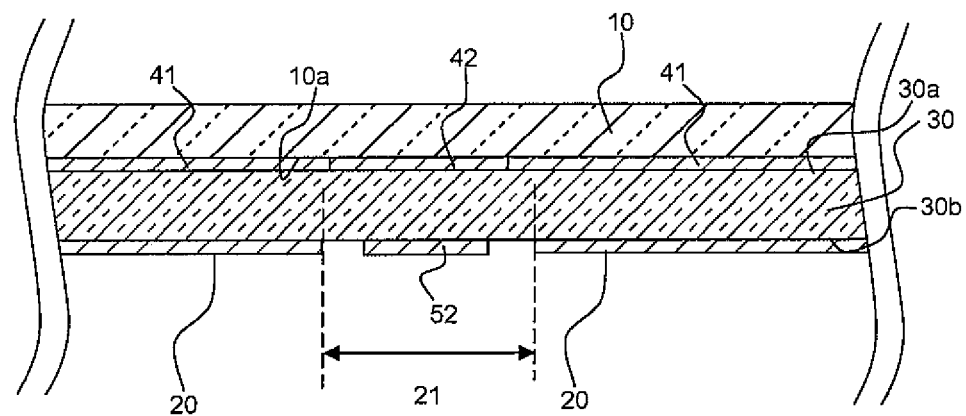
FIG. 11B is a cross-sectional view taken along a line VI-VI in FIG. 10.

FIG. 10 is a plan view and FIGS. 11A and 11B are cross-sectional views schematically showing an input device X4 according to a fourth embodiment of the present invention.

In this embodiment, assuming that the main surface of the base 10 where a conductor such as a human's finger or an input pen directly or indirectly points or presses represents a second main surface 10b, and a main surface of the base 10 opposite to the second main surface 10b represents a first main surface 10a, the first detection electrode pattern 40 and the second detection electrode pattern 50 are formed on the first main surface 10a of the base 10. In addition, the insulation layer 30 is formed on the first main surface 10a of the base 10. Furthermore, the conductive electrode 20 is formed on the second main surface 30b of the insulation layer 30.

When the second main surface 10b of the base 10 in the input region $E_I$ is pressed or pointed with the conductor, the input device X4 detects the position pressed or pointed with the conductor as an input position.

In the input device X4, the first detection electrode 41 and the second detection electrode 51 are provided on the first main surface 10a of the base 10, and the second main surface 10b of the base 10 serves as an input surface through which user's operation is performed. Therefore, in the input device X4, the distance from the conductor to be pointed or pressed to the first detection electrode 41 and the second detection electrode 51 is shorter than that of the input device X1. Consequently, the input device X4 has more improved sensitivity for detecting the input position than the input device X1.

Fifth Embodiment

Figure 12A:
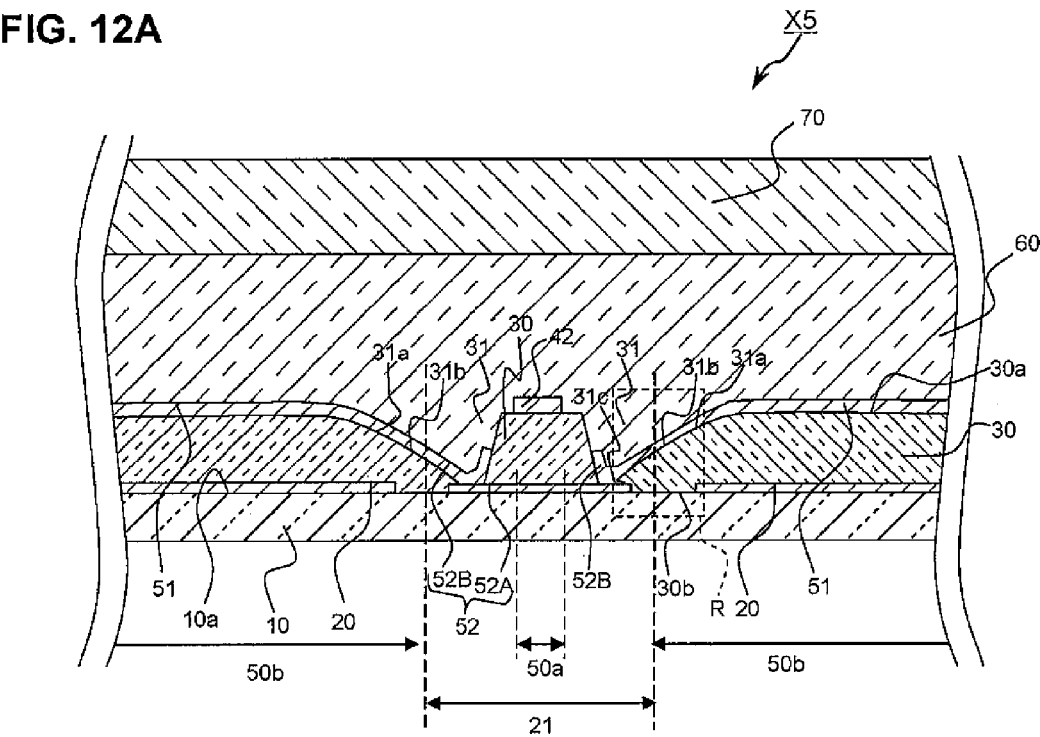
FIG. 12A is a cross-sectional view of an input device according to a fifth embodiment of the present invention.
Figure 12B:
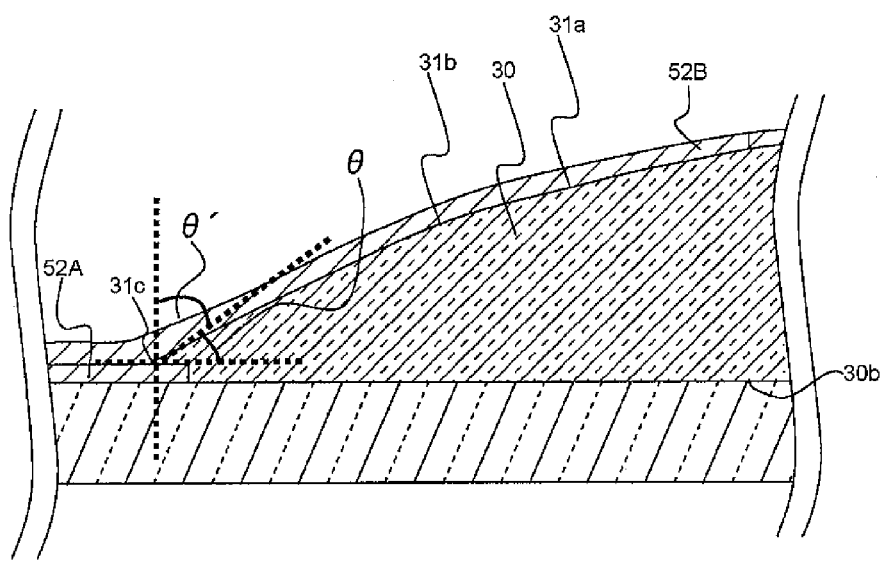
FIG. 12B is an enlarged view of a part R in FIG. 12A.

FIGS. 12A and 12B are cross-sectional views schematically showing an input device X5 according to a fifth embodiment of the present invention. In the input device X5, the inner wall surface 31a of the through hole 31 includes a projection curved surface 31b where a inclination of a tangent line of the projection curved surface 31b increases toward the intersection region 50a in a cross-sectional surface along the second detection electrode pattern 50.

In addition, according to this embodiment, the inclined part 52B of the second connection electrode 52 is provided on the projection curved surface 31b.

Thus, even when the pressing force by the conductor such as the user finger is applied to the insulation layer 30, the stress is not likely to concentrate on the inclined part 52B of the second connection electrode 52.

FIG. 12B is an enlarged view showing a part R of FIG. 12A. In FIG. 12B, θ is the angle between a line parallel to the second main surface 30b and a line tangent to the end part 31c of the inner wall surface 31a, and θ' is the angle between a line perpendicular to the second main surface 30b and a line tangent to the end part 31c.

Here, the inclination angle θ is set smaller than the angle θ'. In addition, it is preferable that the inclination angle θ is set within a range of 2° to 20° because the stress can be more relieved and the inclined part 52B of the second connection electrode 52 is not likely to be observed by a user.

The projection curved surface 31b is formed, after the through hole 31 has been formed or at the same time as the formation of the through hole 31, by heating the material of the insulation layer 30 at a predetermined heating temperature and a predetermined heating time, and adjusting viscosity of the material.

Sixth Embodiment

Figure 13A:
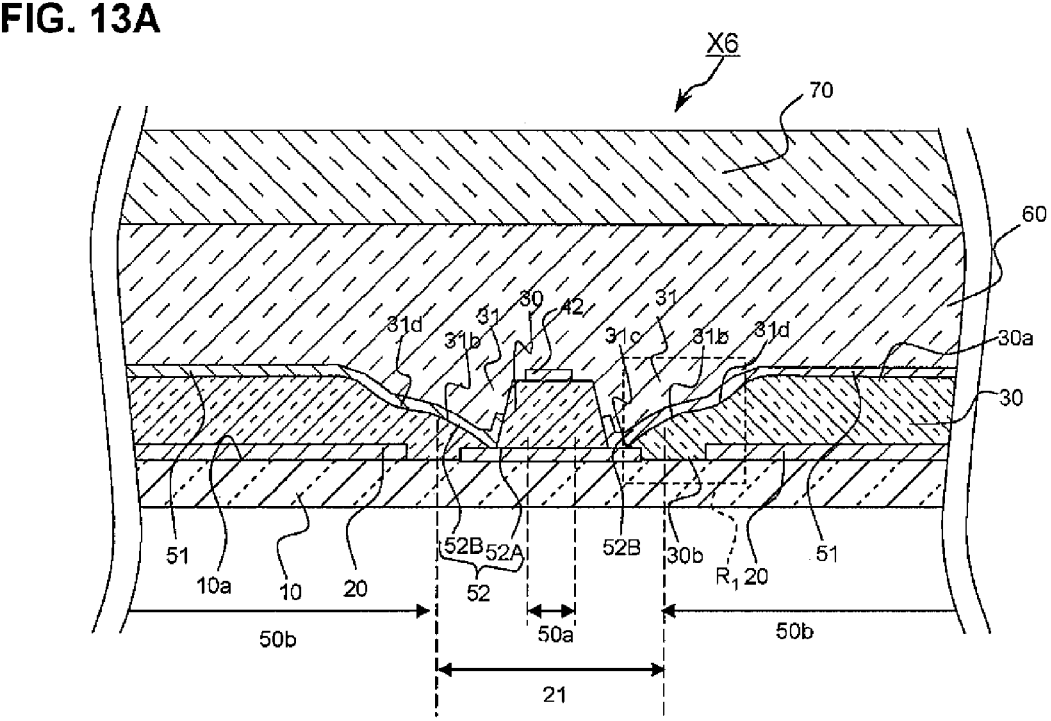
FIG. 13A is a cross-sectional view of an input device according to a sixth embodiment of the present invention.
Figure 13B:
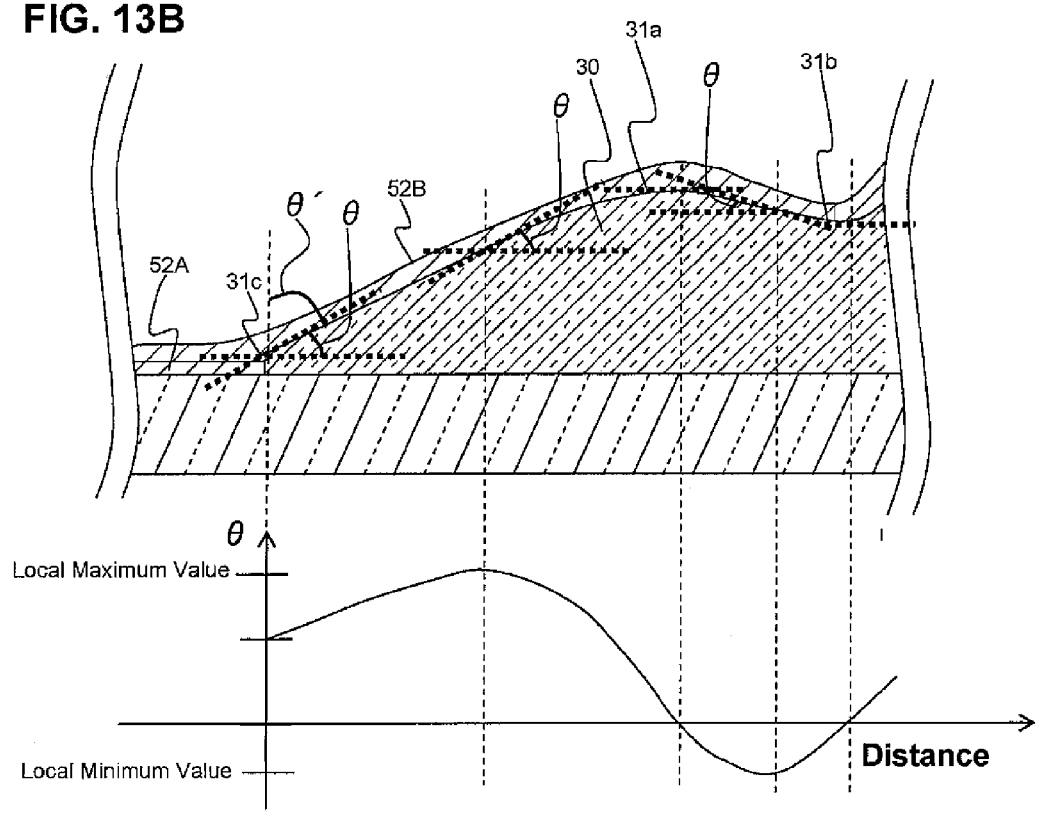
FIG. 13B is an enlarged view of a part $R_1$ in FIG. 13A, and showing a relationship between an inclination angle and a distance.

FIGS. 13A and 13B are cross-sectional views schematically showing an input device X6 according to a sixth embodiment of the present invention. In the input device X6, as compared with the input device X5, the inclination angle θ of the inner wall surface 31a with respect to the second main surface 30b of the insulation layer 30 has a local minimum value including minimum value and a local maximum value including maximum value in the cross-sectional surface along the second detection electrode pattern 50.

FIG. 13B is an enlarged view of a part $R_1$ in FIG. 13A. In addition, FIG. 13B shows a variation in inclination angle θ of the inner wall surface 31a with respect to the second main surface 30b of the insulation layer 30.

Furthermore, the inclination angle θ at each part of the inner wall surface 31a is an angle between a line tangent to the inner wall surface 31a and the direction parallel to the second main surface 30b of the insulation layer 30.

In the input device X6, the inclination angle θ of the inner wall surface 31 with respect to the second main surface 30b of the insulation layer 30 has the local minimum value and the local maximum value in the cross-sectional surface along the second detection electrode pattern 50. Consequently, the inner wall surface 31a further includes a recession curved surface 31d in addition to the projection curved surface 31b. Thus, even when the pressing force by the conductor such as the user finger or input pen is applied to the insulation layer 30, the recession curved surface 31d absorbs the stress, so that the stress applied to the second connection electrode 52 positioned at the end part 31c of the inner wall surface 31a can be further reduced.

While the inclination angle θ of the inner wall surface 31a with respect to the second main surface 30b has one local minimum value in this embodiment, it may have a plurality of local minimum values. Similarly, the inclination angle θ may have a plurality of local maximum values.

Seventh Embodiment

Figure 14A:
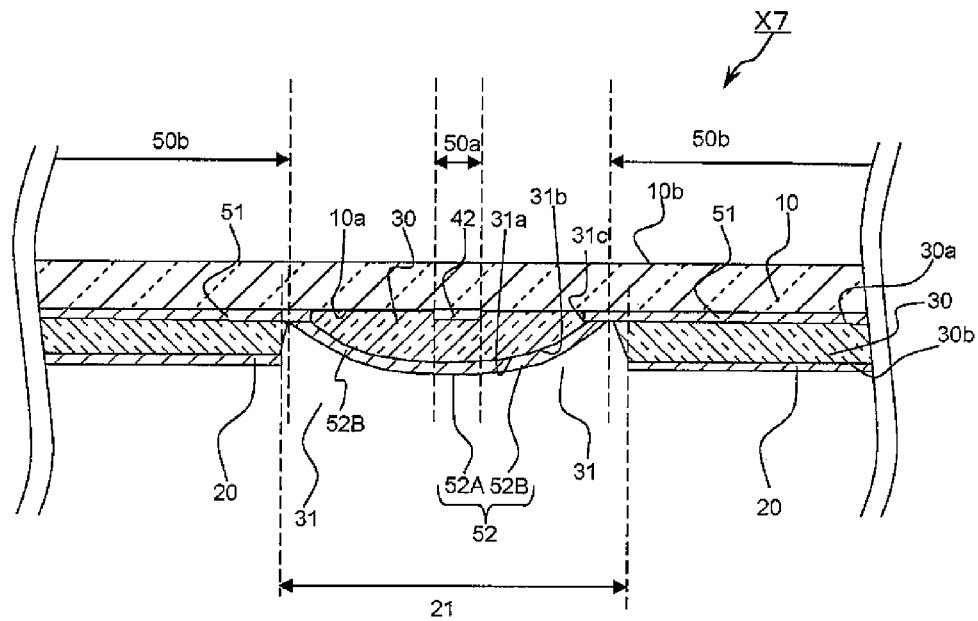
FIG. 14A is a cross-sectional view of an input device according to a seventh embodiment of the present invention.

FIG. 14A is a cross-sectional view schematically showing an input device X7 according to a seventh embodiment of the present invention. The input device X7 is different from the input device X4 in that the inner wall surface 31a of the through hole 31 includes the projection curved surface 31b in the cross-sectional surface along the second detection electrode pattern 50. The projection curved surface 31b in this embodiment is basically the same as the projection curved surface 31b in the fifth embodiment.

Eighth Embodiment

Figure 14B:
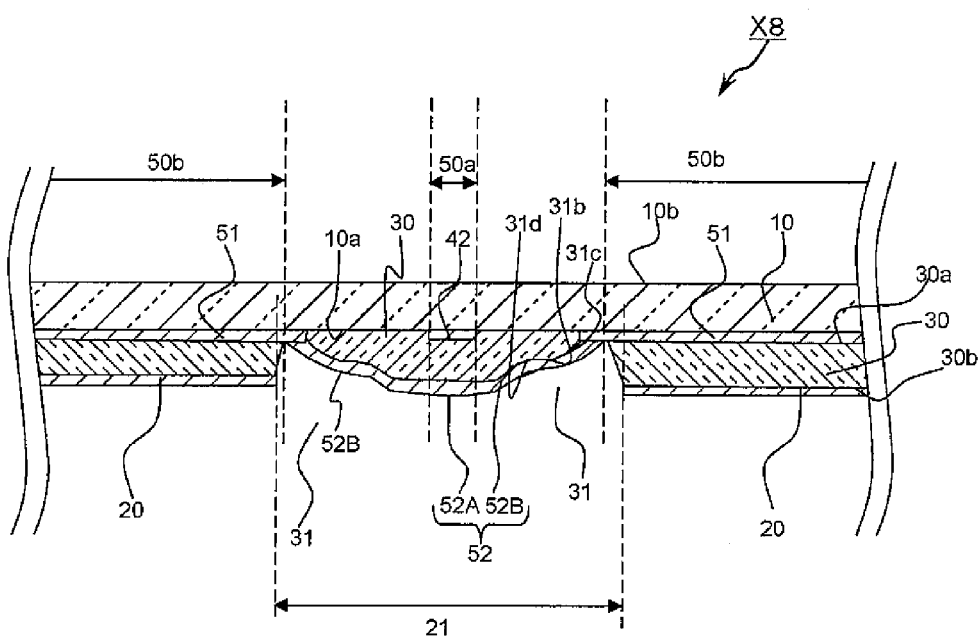
FIG. 14B is a cross-sectional view of an input device according to an eighth embodiment of the present invention.

FIG. 14B is a cross-sectional view schematically showing an input device X8 according to an eighth embodiment of the present invention. The input device X8 is different from the input device X7 in that the inclination angle θ of the inner wall surface 31a with respect to the first main surface 30a of the insulation layer 30 has a local minimum value and a local maximum value in a cross-sectional surface along the second detection electrode pattern 50.

Ninth Embodiment

Figure 15:
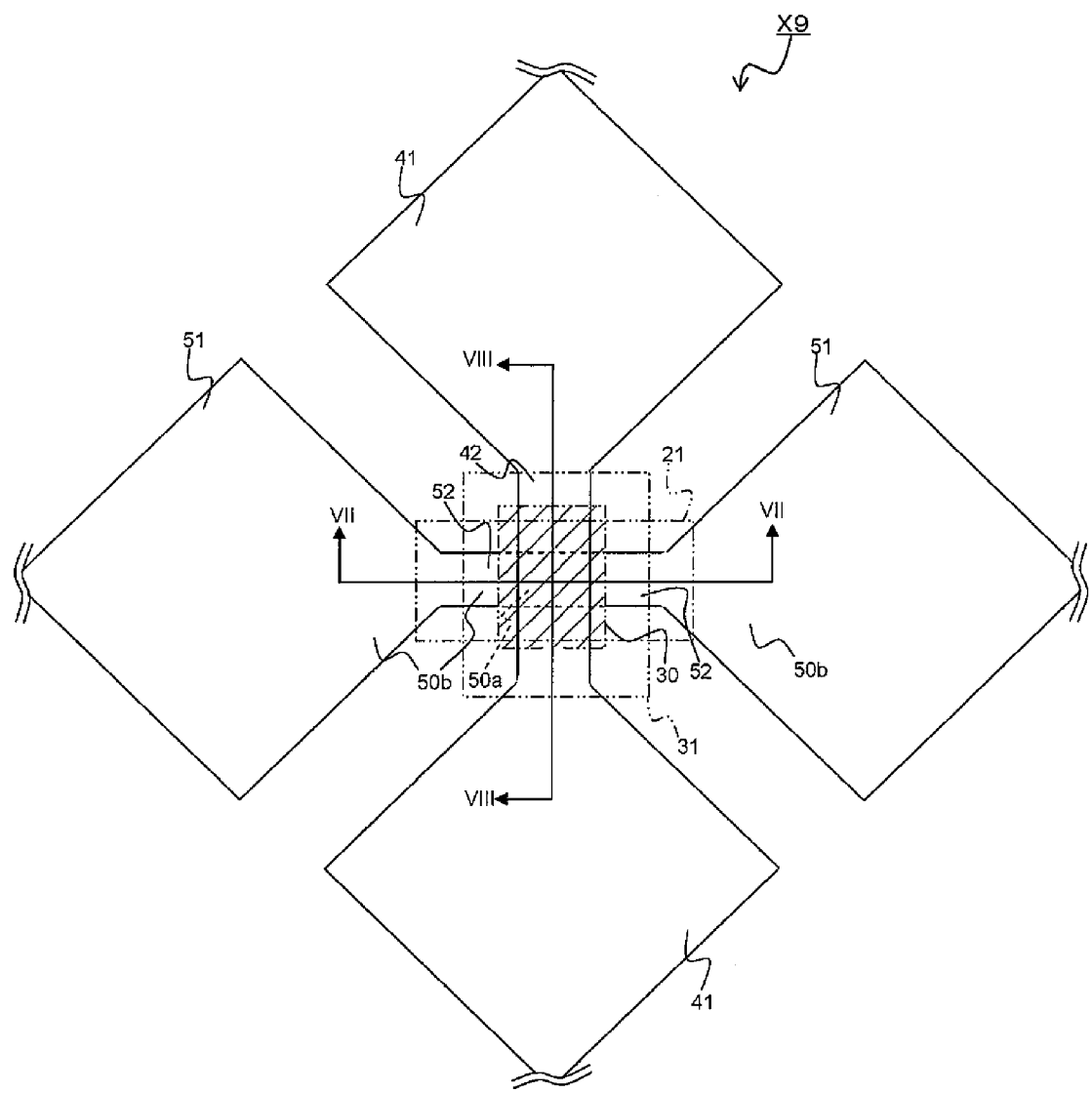
FIG. 15 is a plan view showing an essential part of an input device according to a ninth embodiment of the present invention.
Figure 16A:
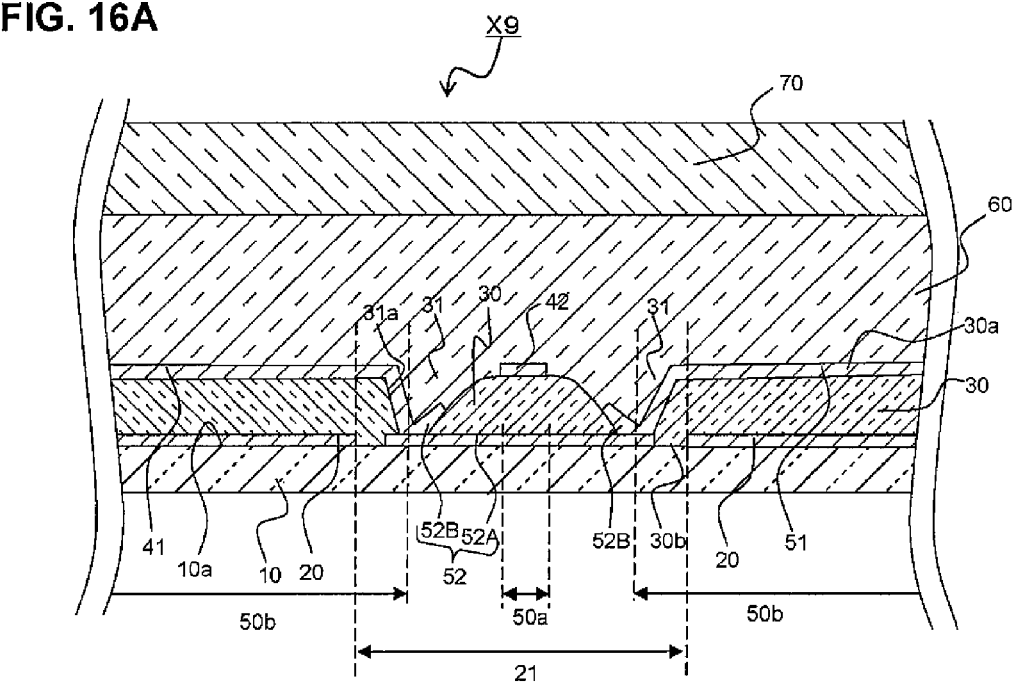
FIG. 16A is a cross-sectional view taken along a line VII-VII in FIG. 15.
Figure 16B:
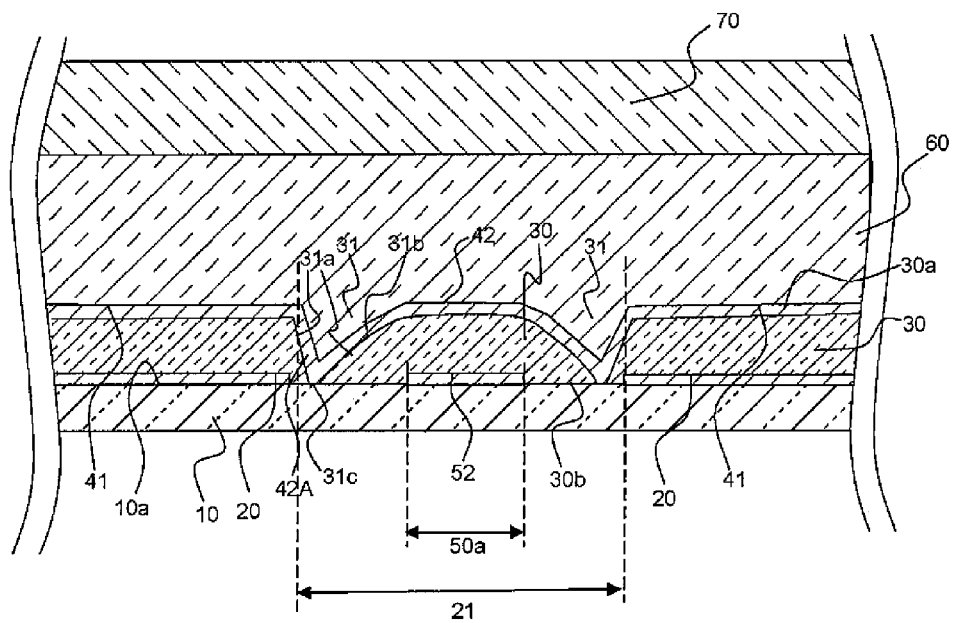
FIG. 16B is a cross-sectional view taken along a line VIII-VIII in FIG. 15.

FIGS. 15, 16A and 16B are cross-sectional views schematically showing an input device X9 according to a ninth embodiment of the present invention. The input device X9 is different from the input device X1 in that the insulation layer 30 has the one through hole 31 with respect to the one opening 21 of the conductive electrode 20.

According to this embodiment, as shown in FIG. 16B, one part 42A of the first connection electrode 42, for example, is arranged on the inner wall surface 31a of the through hole 31 and on the second main surface 30a of the insulation layer 30. In addition, the inner wall surface 30a includes the projection curved surface 31b in a cross-sectional surface along the first detection electrode pattern 40. Furthermore, the one part 42A may be arranged on the projection curved surface 31b.

The insulation layer 30 may have three or more through holes 31 within the one opening 21 of the conductive electrode 20.

Configuration of Display Device

Figure 17:
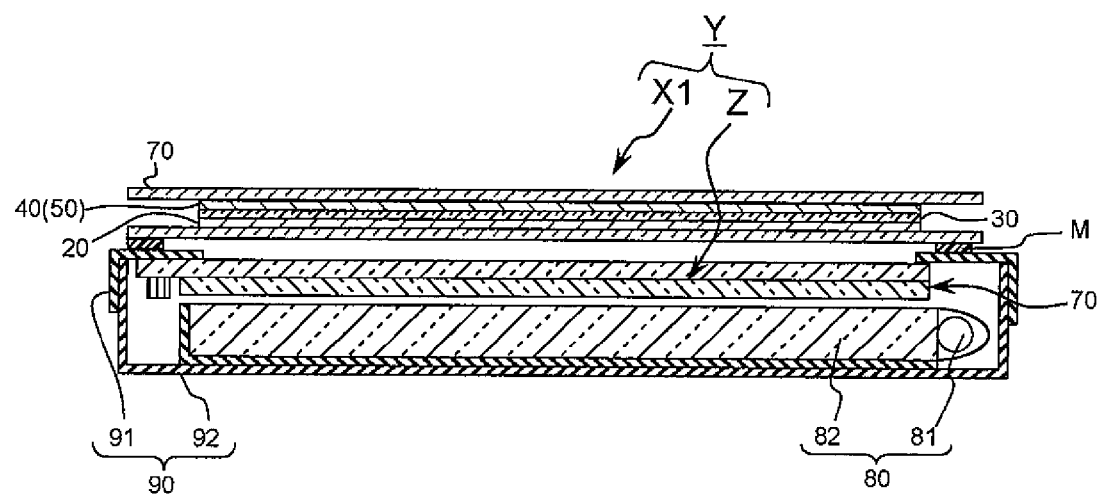
FIG. 17 is a cross-sectional view showing a display device having the input device in FIG. 1.

As shown in FIG. 17, a display device Y includes the input device X1 and a liquid crystal display device Z. The liquid crystal display device Z has a liquid crystal display panel 70, a light source device 80, and a case 90.

Figure 18:
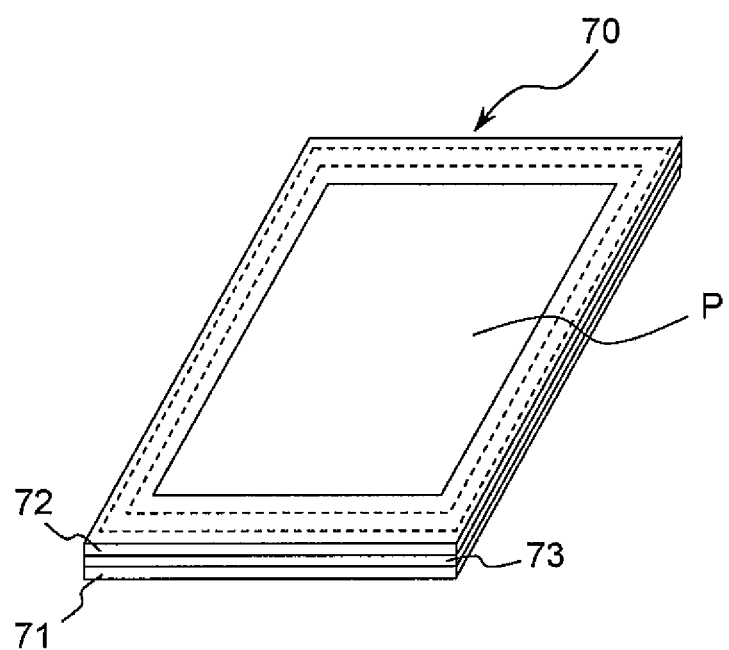
FIG. 18 is a perspective view showing a liquid crystal display panel mounted on the display device in FIG. 17.

As shown in FIG. 18, the liquid crystal display panel 70 includes an upper substrate 71, a lower substrate 72, and a sealing member 73. The liquid crystal display panel 70 has a liquid crystal layer interposed between the upper substrate 71 and the lower substrate 72, and the liquid crystal layer is sealed with the sealing member 73, whereby a display region P including a plurality of pixels to display an image is formed.

The light source device 80 irradiates the liquid crystal display panel 70 with light, and is arranged between the liquid crystal display panel 70 and a lower case 92.

The case 90 houses the liquid crystal display panel 70 and the light source device 80, and has an upper case 91 and the lower case 92. The case 90 is formed of a resin such as a polycarbonate resin, stainless, or metal such as aluminum.

As shown in FIG. 17, the input device X1 is mounted in such a manner that the first detection electrode pattern 40 and the second detection electrode pattern 50 are arranged so as to be opposed to the liquid crystal display panel 70 through the conductive electrode 20 in the display device Y.

In addition, the input device X1 and the liquid crystal display device Z are bonded through a double-faced tape M. Furthermore, a fixing member used in bonding the input device X1 and the liquid crystal display device Z is not limited to the double-faced tape M, and may be a bonding member such as a thermosetting resin and an ultraviolet curable resin, or a fixing structure for physically fixing the input device X1 and the liquid crystal display device Z.

The display device Y has the input device X1 as described above. Thus, even when the conductive electrode 20 is provided in the input device X1, deterioration in the image quality of the display device Y can be suppressed by maintaining permeability of the light.

While the specific embodiments of the present invention have been described in the above, the present invention is not limited to these.

While an example of the display device Y having the input device X1 is described, an input device according to another embodiment of the present invention may be used instead of the input device X1.

While the case where the display panel is the liquid crystal display panel 70 in the display device Y is described, the display panel may be not only the crystal display panel but a CRT, plasma display, organic EL display, inorganic EL display, LED display, fluorescent display tube, field emission display, surface-conduction electron-emitter display, and electronic paper, for example.

In addition, even when the configurations of the input devices X2, X3, and X9 are applied to the input device X4, the same effect as those described in the cases of the input devices X2, X3, and X9 can be obtained.

What is claimed is:

1. An input device comprising:
    an insulation layer having a first main surface, and a second main surface on the opposite side of the first main surface;
    a first detection electrode pattern provided on the first main surface of the insulation layer and arranged along a first direction;
    a second detection electrode pattern arranged along a second direction and having an intersection region provided on the second main surface of the insulation layer so as to intersect with the first detection electrode pattern in a plan view, and a detection region provided on the first main surface of the insulation layer; and
    a conductive electrode provided on the second main surface of the insulation layer, wherein
    the conductive electrode has an opening, and
    the intersection region of the second detection electrode pattern is positioned in the opening.

2. The input device according to claim 1, wherein
    the first detection electrode pattern has a plurality of first detection electrodes to detect an input position, and a first connection electrodes to connect the adjacent first detection electrodes,
    the second detection electrode pattern has a plurality of second detection electrodes to detect the input position, and a second connection electrode to connect the adjacent second detection electrodes, and
    the first connection electrode overlaps the second connection electrode through the insulation layer therebetween to electrically isolate from each other.

3. The input device according to claim 2, wherein
    an adjustment film is provided between the adjacent first detection electrodes, between the adjacent second detection electrodes, or between the first detection electrode and second detection electrode adjacent to each other.

4. The input device according to claim 3, wherein
    the adjustment film is electrically connected to the conductive electrode.

5. The input device according to claim 1, comprising an input region to detect an input position, and an outside region outside the input region, wherein
    the conductive electrode has a high resistance part in the input region and a low resistance part provided in the outside region; and the low resistance part is formed of the same material as the high resistance part, and the low resistance part has a thickness thicker than the high resistance part.

6. The input device according to claim 1, wherein
    the insulation layer has a through hole penetrating the insulation layer in a thickness direction,
    an inner wall surface of the through hole has a projection curved surface, and
    a part of the second detection electrode pattern is provided on the projection curved surface.

7. The input device according to claim 6, wherein
    an angle of inclination of the inner wall surface with respect to the second main surface of the insulation layer has at least one local minimum value and local maximum value.

8. The input device according to claim 6, wherein
    an angle of inclination of the inner wall surface with respect to the first main surface of the insulation layer has at least one local minimum value and local maximum value.

9. The input device according to claim 1, wherein the conductive electrode is set to a reference potential.

10. The input device according to claim 1, further comprising a base to support the insulation layer, wherein
    the first detection electrode pattern and the second detection electrode pattern are provided on a main surface of the base.

11. A display device comprising:
    the input device according to claim 1; and
    a display panel opposed to the first detection electrode pattern and the second detection electrode pattern through the conductive electrode therebetween.

* * * * *